United States Patent [19]

Henslee et al.

[11] Patent Number: 4,880,757
[45] Date of Patent: Nov. 14, 1989

[54] CHEMICAL PREPARATION OF ZIRCONIUM-ALUMINUM-MAGNESIUM OXIDE COMPOSITES

[75] Inventors: Walter W. Henslee, Lake Jackson; Thomas S. Witkowski, Galveston, both of Tex.

[73] Assignee: The Dow Chemical Company, Midland, Mich.

[21] Appl. No.: 822,074

[22] Filed: Jan. 24, 1986

[51] Int. Cl.$^4$ .......................... C04B 35/48; C01F 7/02
[52] U.S. Cl. ..................................... 501/104; 501/102; 501/103; 501/105; 501/127; 423/115; 423/600
[58] Field of Search ............... 501/102, 103, 104, 105, 501/12; 423/600, 115

[56] References Cited

U.S. PATENT DOCUMENTS

| | | |
|---|---|---|
| 2,409,844 | 10/1946 | Field . |
| 4,221,650 | 9/1980 | Friese et al. ..................... 204/195 S |
| 4,314,827 | 2/1982 | Leitheiser et al. ..................... 51/298 |
| 4,506,024 | 3/1985 | Claussen et al. ..................... 501/105 |
| 4,525,464 | 6/1985 | Claussen et al. ..................... 501/103 |
| 4,587,225 | 5/1986 | Tsukuma et al. ..................... 501/105 |
| 4,626,518 | 12/1986 | Watanabe et al. ..................... 501/104 |

FOREIGN PATENT DOCUMENTS

| | | | |
|---|---|---|---|
| 140638 | 5/1985 | European Pat. Off. ............ | 501/104 |
| 1939119 | 2/1971 | Fed. Rep. of Germany . | |
| 2810134 | 9/1979 | Fed. Rep. of Germany ...... | 501/103 |
| 3230216 | 8/1983 | Fed. Rep. of Germany . | |
| 3512368 | 10/1985 | Fed. Rep. of Germany ...... | 501/104 |
| 46-7108 | 2/1971 | Japan ................................... | 501/104 |
| 58-9875 | 1/1983 | Japan ................................... | 501/105 |
| 58-32066 | 2/1983 | Japan . | |
| 687048 | 9/1979 | U.S.S.R. ............................. | 501/104 |
| 1073225 | 2/1984 | U.S.S.R. . | |

Primary Examiner—William R. Dixon, Jr.
Assistant Examiner—Anthony J. Green
Attorney, Agent, or Firm—G. R. Baker

[57] ABSTRACT

A composite ceramic material having improved properties is disclosed as well as several methods for preparing the same. The composite powder is substantially comprised of zirconia and spinel phases, produced by precipitation and calcination of the precipitate of the oxide forming precursor salts. A preferred method for introducing the zirconium is as a soluble and/or decomposable salt during precipitation of the spinel forming hydroxyl or halo hydroxyl spinel forming salts. The zirconium salt decomposes to zirconia during calcining and/or sintering of the powder resulting from the precipitation. A preferred composite is that obtained from magnesium and aluminum salts, resulting in a $MgAl_2O_4$ spinel and intimately admixed $ZrO_2$ which contains a stabilizing agent.

13 Claims, No Drawings

CHEMICAL PREPARATION OF ZIRCONIUM-ALUMINUM-MAGNESIUM OXIDE COMPOSITES

CROSS REFERENCE TO RELATED APPLICATIONS

The following applications are related to the instant application. Application Ser. No. 184,189, filed Sept. 4, 1980, by Walter W. Henslee et al. entitled MAGNESIUM ALUMINUM SPINELS, now abandoned (C-24,807); Application Ser. No. 299,430, Filed Sept. 4, 1981 by Walter W. Henslee et al. entitled MAGNESIUM ALUMINUM SPINELS (C-24,807-B) now U.S. Pat. No. 4,400,431; Application Ser. No. 217,712, filed Dec. 18, 1980, by Dale M. Bertelsman et al. entitled SPINEL SLIP CASTING now abandoned (C-29,253); Application Ser. No. 298,408, filed Aug. 31, 1981 by Dale M. Bertelsman et al. entitled SPINEL SLIP CASTING (C-29,253-A) now U.S. Pat. No. 4,394,455; Application Ser. No. 296,605, Filed Aug. 26, 1981, by Greene Wallace Strother, Jr. entitled CASTING SLIP MADE FROM SPINEL AND SPINEL REFRACTORIES (C-29,371) now U.S. Pat. No. 4,439,532; Application Ser. No. 451,122, Filed Dec. 20, 1982, by Ronald R. Smyth, et al. entitled CERAMIC COMPOSITES WITH IMPROVED THERMAL SHOCK RESISTANCE (C-30,729) now abandoned; Application Ser. No. 643,619, filed Aug. 24, 1984 by Ronald R. Smyth, et al. entitled CERAMIC COMPOSITES WITH IMPROVED THERMAL SHOCK RESISTANCE (C-30,729-A); Application Ser. No. 451,351, Filed Dec. 20, 1982, by Walter W. Henslee et al. entitled PHOSPHATE BONDING OF REACTIVE SPINELS FOR USE IN REFRACTORY MATERIALS (C-30,837) now U.S. Pat. No. 4,459,156 and Application Ser. No. 822,081 filed concurrently herewith, by Walter J. Henslee and Thomas S. Witkowski, entitled CERAMIC COMPOSITES FROM CHEMICALLY DERIVED MAGNESIUM-ALUMINATE AND ZIRCONIUM OXIDE (C-31,200). The teachings of these applications are incorporated by reference into this application.

BACKGROUND OF THE INVENTION

Zirconium dioxide ($ZrO_2$) is one of the more widely studied ceramic materials. It is known that zirconium dioxide can exist in a stable or metastable state as one or more of four phases: the monoclinic, orthorhombic, tetragonal, or cubic crystal structures. The phases present, their amount, size, and distribution can have a profound influence on a whole range of material properties in a composite with another ceramic. A significant level of interest in zirconia ($ZrO_2$) — based ceramics has surfaced in recent years in an attempt to understand and engineer the microstructure of these composites. An engineered microstructure can result in improvements in strength, thermal shock resistance, and fracture toughness values over those of the ceramic without the zirconia addition. In this case zirconia is an effective 'toughening agent' because of a phase transformation in which a volume expansion can occur. Several toughening mechanisms have been theorized and all are process dependent. References by Lange[1], Evans[2], Claussen[3] et al., and Evans & Heuer[4], give full explanations of this phenomenon. Processing of these materials has focussed along three routes, all having the same result of obtaining a dispersion of $ZrO_2$ particles in some ceramic matrix.

[1] Lange, F. F., J. Material Science, 17 (1-4), 225-255, 1982.
[2] Evans, A. G. and McMeeking, R. M., Mechanics of transformation toughening in brittle materials, J. Am. Ceram. Soc., 65 [5]242, 1982.
[3] Claussen, N. and Ruhle, M., "Design of Transformation Toughened Ceramics", p. 137, Advances in Ceramics Vol. 3, Science and Technology of Zirconia, 1981.
[4] Evans, A. G. and Heuer, A. H., "Transformation Toughening in Ceramics:Martensitic Transformations in Cracktip Stress Fields", J. Amer. Ceram. Soc., 63 [5-6]241-48, 1981.

A conventional approach involves mechanically blending or mixing two (or more) components or their precursor powders together, adding organic lubricants and binders, pressing into a shape, and sintering at a temperature high enough to promote densification. However, zirconium dioxide requires a relatively high sintering temperature (>1700° C.) to attain the densities required for these toughening mechanisms to operate. The acceptance of improved mixing technologies to ensure uniform homogeneity of the zirconia phase, along with technological improvements in pressing and sintering (e.g. isostatic pressing, hot pressing, hot isostatic pressing), have effectively lowered the sintering temperature necessary for densification to more practical levels (~1450°-1700° C.). A lower sintering temperature is advantageous because it also minimizes excessive grain growth of the zirconia particles which consequently improves metastable phase retention levels and strengths.

Tough zirconia ceramics have been fabricated from spinel (of fused cast origins), silicon carbide, and mullite. (All show improvements in fracture toughness, strengths, and in some cases, thermal shock resistance.) However, the most widely studied system is the aluminum oxide-zirconium oxide ($Al_2O_3$—$ZrO_2$) system, where particles of stabilized or unstabilized zirconia are added to $Al_2O_3$, mixed, and densified.

Another method for making toughened zirconia ceramics involves a conventional powder oxide (or precursor) mechanical mixing approach using zirconium oxide and a stabilizer. Conventional high temperature sintering is done with subsequent heat treatments at lower temperatures to produce a "composite" of two or more of the zirconia phases. The shape, size, and homogeneity of this phase (phases) is determined by the heat treatment employed which in turn, determines the final properties of the ceramic article. The amount of stabilizer added also influences the type and amount of minor phase precipitates formed. Conventional processes are used either in the powder preparation and/or the powder mixing step.

A third method of obtaining a dispersion of $ZrO_2$ particles in a ceramic matrix involves a chemical reaction to produce these particles and matrix in-situ from completely different starting constituents. For example, a well documented reaction involves that of zircon and alumina to form zirconia in a mullite matrix as follows:

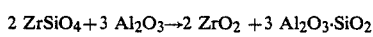

$$2\ ZrSiO_4 + 3\ Al_2O_3 \rightarrow 2\ ZrO_2 + 3\ Al_2O_3 \cdot SiO_2$$

Again, this reaction involves the mixing of two already formed oxide materials, physically blending them to ensure homogeneity, and hot-pressing them to carry out the reaction at a lower temperature.

Some references cite examples where one or more of the zirconia composite constituents were chemically produced and physically mixed to form the composite powder. But, to the best of our knowledge, no information is available on processes where the constituents of the zirconia toughened ceramic have been simultaneously precipitated. One of the constituent materials can be the stabilizer precursor salt for the zirconia phase. One advantage to this process is the homogeneity achieved with the constituent precursors. This can eliminate the need to further mechanically blend the powders in subsequent processing. Another advantage lies with the chemical precipitation process itself. This process produces finely divided, pure precipitates which, when processed and dried properly, yield highly active, sinterable powders. This can alleviate the need for expensive pressing operations (i.e. hot-pressing) to achieve lower sintering temperatures for densification into a fine-grained ceramic unit.

BRIEF DESCRIPTION OF THE INVENTION

In accordance with the present invention, spinel forming metals, preferably in the soluble form, are precipitated in a reaction medium of pH 4–12. The resulting precipitate (a precursor) is washed, dried, and calcined to produce a powder suitable for pressing into shaped objects, or it is slip cast into shaped objects and fired (sintered) into a dense refractory and/or a ceramic body. Such a process admits to the addition of a zirconium oxide forming compound at any step prior to densification. Such addition of the zirconium material to the spinel material can produce a composite ceramic body which has improved properties (e.g. thermal shock resistance) when compared to either material alone. Improved properties depend on the amount of zirconium containing material added, the point in the powder production process at which it is added and the conditions under which it is dried, calcined, and sintered.

The preferred point of addition of the zirconium compound is with the addition of the spinel precursor-forming compounds such that precipitation of the oxide forming metals occurs. Another excellent manner of addition is to slurry the final precursor filter cake with a solution of the zirconium compound under conditions to precipitate the zirconium compound or cause it to adsorb onto the previously formed spinel precursor precipitate particles. Another preferred method of addition is to add a dry or slurry suspended form of the zirconium compound (e.g. finely divided $ZrO_2$ or a finely divided decomposable salt which forms the oxide on calcination) during the precipitation, or after precipitation but prior to calcination of the spinel precursor salt. Here the most preferred zirconium compounds are fine powders, preferably with crystallite particle sizes of less than 1 micron.

In general it is most desirable if the zirconium compound is introduced into the process for preparing the spinel precursor and has either a particle size less than one micron or is added in a manner to produce a particle size in that range.

It is to be understood that in some applications the zirconium oxide ($ZrO_2$) must be stabilized to some degree depending on the conditions under which the ceramic will be subjected during fabrication and use. Stabilizing oxides are well known, and include MgO, CaO, $Y_2O_3$, and the rare earth oxides. These may be used per se or formed from heat decomposable salts of these metals. This stabilization is often necessary in ceramic bodies containing $ZrO_2$ because certain disruptive phase transformations may occur during fabrication or use.

It is to be further understood that one also can prepare the precursor convertible to a spinel by mixing at least one water soluble salt of a spinel forming metal with finely divided insoluble powders of the other spinel precursor components and zirconium compound. This may be a spinel forming compound(s), a metal oxide(s) or other salt decomposable to the oxide. The zirconium compound may be the oxide or a decomposable salt of zirconium which forms such oxides on heating. In either case, the zirconium compounds may contain stabilizing agents in quantities to partially or fully stabilize the zirconia.

It is to be further understood that one can also prepare a precursor material in which one of the spinel-forming metal salts is present in an amount excessive to the formation of a stoichiometric spinel. This material on heating decomposes to its oxide form, and, if it satisfies the requirements necessary to be a zirconia stabilizer, may do so. This material may be present in quantities to partially or fully stabilize the zirconium containing phase or be present in its oxide form as a discrete phase within the composite.

DETAILED DESCRIPTION OF THE INVENTION

EXAMPLE 1

7.3% $ZrO_2$—92.7% $MgAl_2O_4$ Composite - simultaneous precipitation of a Mg-Al precursor using a zirconyl nitrate salt Two hundred ninety seven and fifty three hundredths (297.53) grams of sodium aluminate ($NaAlO_2$) dissolved in seven thousand four hundred ninety four cubic centimeters (7494 cc) of water was added to a vessel at the rate of 43 cc per minute while simultaneously adding to the same vessel three hundred forty four and seventy five hundredths (344.75) grams of magnesium chloride ($MgCl_2$), one hundred seventy six and one-half (176.5) grams of zirconium oxy nitrate in three thousand four hundred ninety one (3491) cubic centimeters of water at a rate of 19.4 cc per minute. The contents of the vessel were continuously stirred. The temperature of the contents of the vessel was maintained at about 50° C. The initial pH of the contents of the vessel was 1.9 but rose within ten (10) minutes to 10.77 whereupon hydrochloric acid was added to adjust the pH. The pH slowly dropped throughout the reaction to 10.66. Thirty seven (37) minutes after the initial reactants were admixed, one thousand (1000) cubic centimeters of the sodium aluminate solution was slowly added over a four (4) minute period while maintaining the steady addition of sodium aluminate and the magnesium chloride/zirconium nitrate. A fine precipitate formed almost immediately and was maintained in suspension by continuous stirring. A similar amount of sodium aluminate, one thousand (1000) cubic centimeters, was added at fifty nine (59) minutes after the initial mixing of the reactants. A final addition of one thousand four hundred ninety four (1494) grams of sodium aluminate was slowly added one hour and thirty five minutes after the initial mixing of the reactants. The precipitate which was formed was maintained in the reaction solvent at 50° C. for an additional forty two (42) minutes following addition of the last aliquot of sodium aluminate. The final pH of solution was 10.07. The precipitate was washed by the addition of deionized water to the reaction vessel and filtered to recover the precipitate. The filter cake was washed with several aliquots of deionized water and dried. Analysis of the resulting powder showed the powder contained 7.3 weight percent zirconium. Following drying, the powder was calcined at 1000° C. for 4 hours.

EXAMPLE 2

10% $ZrO_2$—90% $MgAl_2O_4$ Composite - Simultaneous precipitation of a Mg-Al precursor with a zirconium oxychloride precursor salt Two feed solutions, one consisting of three thousand cubic centimeters (3000 cc) of a 13.5% sodium aluminate ($NaAlO_2$) solution (pH 13.0) and another consisting of the liquid mixture of two thousand six hundred and sixty four cubic centimeters (2664 cc) of a 9.5% solution of magnesium chloride, two hundred forth cubic centimeters (240 cc) of a commercially available zirconium oxychloride (20% $ZrO_2$ content by precipitated weight), and ninety six cubic centimeters (96 cc) of deionized water (mixture pH 0.9) were simultaneously added to a reaction vessel containing two thousand cubic centimeters (2000 cc) of deionized water at a constant rate of 27 cc/minute. The contents of the vessel were continuously stirred. The temperature of the contents of the vessel was maintained at room temperature (21° C.). The initial pH of the deionized water contents of the vessel was 6.0 but rose immediately upon the addition of both feed mixtures to 10.3. A ten percent (10%) hydrochloric acid (HCl) solution was added, as needed, to adjust the pH to 9.7 within 2 minutes into the experiment. The pH was kept stable at 9.6-9.7 throughout the experiment by adding HCl as needed. A total of eight hundred and ten cubic centimeters (810 cc) of HCl solution was added over the one hundred ten minute (110) duration of the run.

A fine precipitate formed almost immediately and was maintained in suspension by continuous stirring. The precipitate was aged in the mother liquor for one hour and fifteen minutes prior to filtration. The final pH of the reactor contents was 9.7. The precipitate slurry was filtered in 600 cc aliquots. This produced a wet cake thickness of approximately one inch in a vacuum filter of 4 inches in diameter. The wet cake was consecutively washed with six bed depths (filtered slurry) of deionized water. The wet cake was stored in a sealed plastic container for 24 hours prior to drying. The wet cake was first dried at 150° C. overnight and then calcined at 1000° C. for 4 hours.

EXAMPLE 3

10% $ZrO_2$—90% $MgAl_2O_4$ Composite; Precipitation of a Mg-Al precursor with a slurried zirconium oxide powder in the reactor Two feed solutions, one consisting of three thousand cubic centimeters (3000 cc) of a 13.5% sodium aluminate ($NaAlO_2$) solution (pH 12.9), and another consisting of the liquid mixture of two thousand six hundred and sixty four cubic centimeters (2664 cc) of a 9.6% solution of magnesium chloride ($MgCl_2$) and three hundred thirty six cubic centimeters (336 cc) of deionized water and forty five grams (45 g) of a commercially available zirconium oxide (pH mixture—6.3) were added simultaneously to a reaction vessel containing two thousand cubic centimeters (2000 cc) of deionized water or an initial rate of 27 cubic centimeters per minute. The contents of the magnesium chloride/water/zirconium oxide solution were continuously stirred to keep the $ZrO_2$ from settling. The contents of the reaction vessel were stirred as well. The temperature of the contents of the reaction vessel was maintained at room temperature. The initial pH of the deionized water contents of the vessel was 6.5 but rose immediately upon the addition of both feed mixtures to 10.0. A ten percent (10%) hydrochloric acid (HCl) or a ten percent (10%) sodium hydroxide (NaOH) solution was added, as needed to adjust the pH to approximately 9.8. At two minutes into the experiment the pH was 9.7 and stabilized there for the duration of the one hundred ten minute run.

A fine precipitate formed almost immediately and was mixed with the zirconium oxide addition continuously. The precipitates were kept in solution 17 hours prior to filtration. No noticeable changes in pH occurred during this time. The precipitate slurry was filtered in 600 cc aliquots, producing a wet cake thickness of approximately one and one quarter inches in a vacuum filter of four inches in diameter. The wet cake was consecutively washed with six bed depths (filtered slurry) of deionized water. The wet cake was then dried at 150° C. overnight and then calcined at 1000° C. for four hours.

EXAMPLE 4

40% $ZrO_2$—60% $MgAl_2O_4$ composite Pilot Plant scale-up; continuous operation to coprecipitate via zirconium oxychloride route A zirconium/magnesium/aluminum precursor salt was made in a pilot plant facility by first equilibrating the flow rates in the plant to make the Mg-Al precursor of a given 1.94 ratio and then adding a third stream of zirconium oxychloride in a calculated ratio to arrive at the desired 40% $ZrO_2$—60% $MgAl_2O_4$ ratio in the final sintered product.

Two feed solutions, one consisting of an 11.63% magnesium chloride ($MgCl_2$) and another consisting of an 11.0% sodium aluminate ($NaAlO_2$) solutions were prepared and coprecipitated to form a Mg-Al hydroxide chloride slurry at flowrates of 1.27 gallons per minute (gpm) for $MgCl_2$ and 2.05 gpm for the $NaAlO_2$. The pilot plant conditions equilibrated 68 minutes into the run at 50° C. (pH 9.4) to make a consistent Mg-Al precursor with a 1.94 Al/Mg molar ratio. At this time a third feed of 20% zirconium oxychloride solution ($ZrOCl_2$) was added at a rate of 0.6 gpm. Four minutes later (72 minutes into the run) 10% sodium hydroxide (NaOH) was added, as needed, for a pH control of 9.4. Material caught during the next 38 minutes was discarded as being low in Zr content (i.e. from 68 to 116 minutes into the run). At 116 minutes into the run, 48 minutes after the introduction of zirconium oxychloride, the slurry became too thick to adequately mix. The contents of the reactor were then pumped to holding drums as the flows of all three lines continued. The final pH of the reaction was 9.4. A total of 60 gallons of $MgCl_2$, 97 gallons of $NaAlO_2$, and 28.2 gallons of $ZrOCl_2$ were used to produce the composite precursor.

Five barrels of reactor slurry were caught. These were systematically decanted, washed with deionized water, allowed to settle. This procedure was repeated four times to adequately wash any residual reactor salts from the slurry. The clears from the suspension were analyzed and showed no leaching of Zr, Mg, or Al from the slurry. Sodium salt levels decreased from 8.0 to 0.6%. After the final decanting operation, the cake slurry was re-slurried and pumped to a belt filter where it was filtered and stored in polyethylene drums. Wet cake samples were dried at 150° C. and calcined to 1000° C. for four hours.

X-ray diffraction (XRD) analysis shows that the dried 40% $ZrO_2$—$MgAl_2O_4$ precursor sample is composed of gibbsite, $Al(OH)_3$, some bayerite and a poorly crystallized magnesium aluminate. No crystaline zirconium compounds are seen by XRD. However, peaks for Zr are seen in the Energy Dispersive X-ray (EDX) spectra, along with major peaks for Cl, Mg, and Al.

Scanning Electron Microscopy of the dried precursor composites show the discrete particles of $Al(OH)_3$, and the layered Mg-Al hydroxide particles cemented together in the form of approximately 10 micron agglomerates. A spot EDX of the binder phase material shows it to be rich in zirconium. This zirconium containing phase appears to have uniformly coated the precipitated magnesium•aluminum hydroxide precursor.

This powder on calcination to 1000° C. shows a well crystallized magnesium aluminate spinel phase and a mixture of cubic and monoclinic zirconium oxide phases.

The surface area of the precursor hydroxychloride composite of example 4 is 83 $m^2/gm$. This value is comparable to those of the Mg-Al hydroxychlorides prepared as described in U.S. Pat. No. 4,400,431. On calcination to 1000° C., this is reduced to 27 $m^2/gm$. This compares to values of 1-5 $m^2/gm$ obtained for commercially available zirconias and spinel of fused origins. This high activity level is necessary for densification at temperatures lower than traditional sintering temperatures.

Methods and Evaluation of Pressed and Sintered Ceramic Oxides

Pellet studies of pressed and sintered disks made from these powders were performed in the following manner. The calcined powders were sieved through a 100 mesh screen and pressed into at least four (4) one and one-quarter inch pellets of varying thicknesses. No binders were used. Pressing pressures did not exceed 68.9 MPa (10,000 psi). These disks were dried at 60° C. for four hours to remove any residual moisture. Sintering occurred at 1530° C. for a 10 hour hold following a slow (8 hours) temperature rise from room temperature to the hold temperature. Pellet measurements were taken prior to and after sintering and densities and shrinkages were calculated using the ASTM C-20 method. Flexure strength measurements, where cited, were performed in accordance to ASTM F 394-78. These studies are summarized in Table 1.

The green density measurements of 35-40% of theoretical density indicate moderate strengths. When binders are used, the green density can be improved to a more desirable industrial standard of 40% of theoretical density. Optimal densification occurred in the 10% $ZrO_2$-$MgAl_2O_4$ prepared via the zirconium oxy-chloride coprecipitation route. A less preferred route, showing poor densification, occurred when a slurry of zirconium oxide, formed previously from a fusion route, was added during the coprecipitation of the Mg-Al precursor phase. The observed shrinkages for all the powders are typical for powders derived via chemical routes and can be tailored by changes in the calcination temperatures.

Strengths were measured on the 10% $ZrO_2$ composite prepared via the zirconyl nitrate route. The observed strengths of 178 MPa (25,800 psi) is within the usable range for refractory or ceramic applications. Strengths in this system are a function of densification, amount of zirconia phase present, and the crystal structure of the zirconia.

TABLE I

| Description | Green Density (% theoretical) | Fired Density* (% theoretical) | Shrinkage | Comments |
|---|---|---|---|---|
| 7.3 w/o $ZrO_2.MgAl_2O_4$ via Zirconyl Nitrate Coprecipitate Route | 1.506 g/cc (40%) | 2.907 g/cc (78%) | 18.9% | MOR - 25,800 psi 178 Mpa |
| 10 w/o $ZrO_2$—$MgAl_2O_4$ via Zirconium Oxychloride Coprecipitation Route | 1.324 g/cc (35%) | 3.395 g/cc (90%) | 27.6% | |
| 10 w/o $ZrO_2$—$MgAl_2O_4$ via Zirconium Oxide Slurry Addition (reactor) Route | 1.432 g/cc (38%) | 2.159 g/cc (57%) | 14.8% | |
| 40 w/o $ZrO_2$—$MgAl_2O_4$ via Zirconium oxychloride coprecipitation Route | 1.685 g/cc (37%) | 3.445 g/cc (76%) | 21.6% | |

*Sintering Temperature at 1530° C. for 10 hours.

We claim:

1. A sinterable precursor powder convertible to zirconia-spinel ceramic composites comprised of spinel forming metal compounds intimately admixed with a zirconium compound, said powder consisting of an intimate admixture derived from intimately admixing in a liquid medium
   (1) at least one decomposable salt of a metal or metals which form spinel crystal structures on calcination,
   (2) a zirconium compound selected from the group consisting of
      (a) a salt capable of being converted upon heating to zirconium oxide, or
      (b) a fine zirconium oxide powder which admixture is co-precipitated, and the solids recovered, said metal or metals being present in mole ratios to form the spinel structure with or without an additional amount of one of the spinel forming metals to form a segregated metal oxide phase when converted and said metal/metals and said zirconium compound being present in an amount greater than 0 but less than 100% of the total weight of the composition.

2. The powder of claim 1 wherein the spinel forming metal compounds are compounds of magnesium and aluminum.

3. The powder of claim 1 wherein the zirconium compound is present in amount of from greater than zero to less than 50%.

4. The powder of claim 1 wherein the zirconium compound is present in an amount of from 5-20%.

5. The powder of claim 1, wherein the spinel forming metal compounds are compounds of magnesium and aluminum.

6. A composite produced by heating the powder of claim 1 to a temperature sufficient to substantially convert the precursor components to a composite of the spinel and zirconium oxide with or without other oxide stabilizers.

7. The composite of claim 6 comprising a spinel matrix and a zirconium oxide segregated phase intimately dispersed therein.

8. The composite as defined in claim 6 wherein said zirconium oxide particle size is less than one micron.

9. A method for preparing a sinterable ceramic material which comprises
    (a) intimately admixing in a liquid medium
        (1) at least one decomposable salt of a metal or metals which form spinel crystal structures on calcination
        (2) a zirconium salt capable of being converted to zirconium oxide on heating or a fine zirconium oxide powder;
    (b) precipitating said salt or salts by evaporation at a pH wherein the soluble salt or salts precipitate;
    (c) recovering said precipitate substantially free of the liquid medium in which the precipitation occurred; and
    (d) calcining said precipitate at least to a temperature where the spinel structure forms and zirconium oxide is present
        wherein said spine forming metals are present in mole ratios sufficient to form the spinel structure as the major composite powder component of the composition and wherein the zirconium compound is present in a sufficient quantity to constitute from greater than 0 to less than 100 weight percent of the total composition as the Zirconium oxide component.

10. The method of claim 9 wherein said spinel forming metal salts are magnesium salts and aluminum salts.

11. The method of claim 9 wherein said pH of precipitation is from about 4 to about 12.

12. The method of claim 9 wherein a stabilized zirconium oxide is added to or formed in situ with said spinel forming metal salts.

13. The method of claim 11 wherein a stabilizer, selected from the group of magnesium, calcium, yttrium, or aluminum compounds is included.

* * * * *

UNITED STATES PATENT AND TRADEMARK OFFICE
CERTIFICATE OF CORRECTION

PATENT NO. : 4,880,757

DATED : November 14, 1989

INVENTOR(S) : Walter W. Henslee and Thomas S. Witkowski

It is certified that error appears in the above-identified patent and that said Letters Patent is hereby corrected as shown below:

Column 2, Line 1; insert a space between "$ZrO_2$" and "particles".

Column 4, Line 26; "simultaneous" should read --Simultaneous--.

Column 4, Line 42; "the vessel was 1.9" should be changed to read --the vessel was 9.1--.

Column 6, Line 24; insert a space between "$MgAl_2O_4$" and "composite".

Claim 10, Line 7; change "spine" to --spinel--.

Signed and Sealed this

Nineteenth Day of February, 1991

Attest:

HARRY F. MANBECK, JR.

Attesting Officer

Commissioner of Patents and Trademarks